(12) United States Patent
Ungureanu et al.

(10) Patent No.: US 8,335,889 B2
(45) Date of Patent: *Dec. 18, 2012

(54) CONTENT ADDRESSABLE STORAGE SYSTEMS AND METHODS EMPLOYING SEARCHABLE BLOCKS

(75) Inventors: Cristian Ungureanu, Princeton, NJ (US); Cezary Dubnicki, Warsaw (PL)

(73) Assignee: NEC Laboratories America, Inc., Princeton, NJ (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/540,742

(22) Filed: Aug. 13, 2009

(65) Prior Publication Data

US 2010/0070698 A1 Mar. 18, 2010

Related U.S. Application Data

(60) Provisional application No. 61/095,994, filed on Sep. 11, 2008.

(51) Int. Cl.
*G06F 7/00* (2006.01)
*G06F 9/44* (2006.01)
*G06F 12/02* (2006.01)
*G11C 15/00* (2006.01)

(52) U.S. Cl. ............... 711/108; 707/206; 707/E17.014; 711/154; 711/E12.001

(58) Field of Classification Search .................. None
See application file for complete search history.

(56) References Cited

U.S. PATENT DOCUMENTS

| | | | | |
|---|---|---|---|---|
| 3,290,659 A | * | 12/1966 | Fuller et al. ............... | 365/49.17 |
| 3,309,676 A | * | 3/1967 | Hickey .......................... | 360/63 |
| 5,384,568 A | * | 1/1995 | Grinberg et al. ................ | 341/51 |
| 5,430,439 A | * | 7/1995 | Bodet et al. ................... | 340/7.52 |
| 5,544,357 A | * | 8/1996 | Huei .............................. | 707/715 |
| 7,904,642 B1 | * | 3/2011 | Gupta et al. .................... | 711/108 |
| 2002/0126672 A1 | * | 9/2002 | Chow et al. .................... | 370/392 |
| 2004/0117173 A1 | * | 6/2004 | Ford et al. ........................ | 704/9 |
| 2004/0215622 A1 | | 10/2004 | Dubnicki et al. | |
| 2005/0135381 A1 | | 6/2005 | Dubnicki et al. | |
| 2007/0208748 A1 | | 9/2007 | Li | |
| 2008/0005334 A1 | | 1/2008 | Utard et al. | |
| 2008/0201335 A1 | | 8/2008 | Dubnicki et al. | |
| 2008/0201428 A1 | | 8/2008 | Dubnicki et al. | |
| 2008/0300851 A1 | * | 12/2008 | Chakrabarti et al. ........... | 703/22 |
| 2009/0089335 A1 | * | 4/2009 | Shitomi et al. ................ | 707/200 |
| 2009/0132775 A1 | * | 5/2009 | Otani et al. .................... | 711/162 |
| 2011/0131185 A1 | * | 6/2011 | Kirshenbaum ............... | 707/654 |

OTHER PUBLICATIONS

Collins, G. A Method for Overlapping and Erasure of Lists. Communications of the ACM. vol. 3, No. 12. Dec. 1960. pp. 655-657. (3 pages).

(Continued)

*Primary Examiner* — Jasmine Song
*Assistant Examiner* — Daniel Bernard
(74) *Attorney, Agent, or Firm* — James Bitetto; Joseph Kolodka

(57) ABSTRACT

In accordance with exemplary embodiments of the present invention, a content addressable data structure system may include directed acyclic graphs (DAGs) of data content that are addressed using both a user-defined search key and content of data blocks. Internal keys of retention roots of the DAGs may be derived from the user-defined search key while the remaining blocks may be content addressed. As opposed to using a content address, the user may provide the search key when retrieving and deleting DAGs retaining the data content. In addition, the internal keys may be implemented using internal content addressable storage operations, such as applying a hash function and employing a distributed hash table.

19 Claims, 7 Drawing Sheets

OTHER PUBLICATIONS

EMC Centera: Content Addressed Storage. Product Description Guide. 2003. (21 pages) http://france.emc.com/collateral/hardware/data-sheet/c938-centera-guide.pdf.

Wikipedia. Garbage Collection (Computer Science). Aug. 11, 2009. (12 page) http://en.wikipedia.org/wiki/Garbage_collection_(computer_science).

* cited by examiner

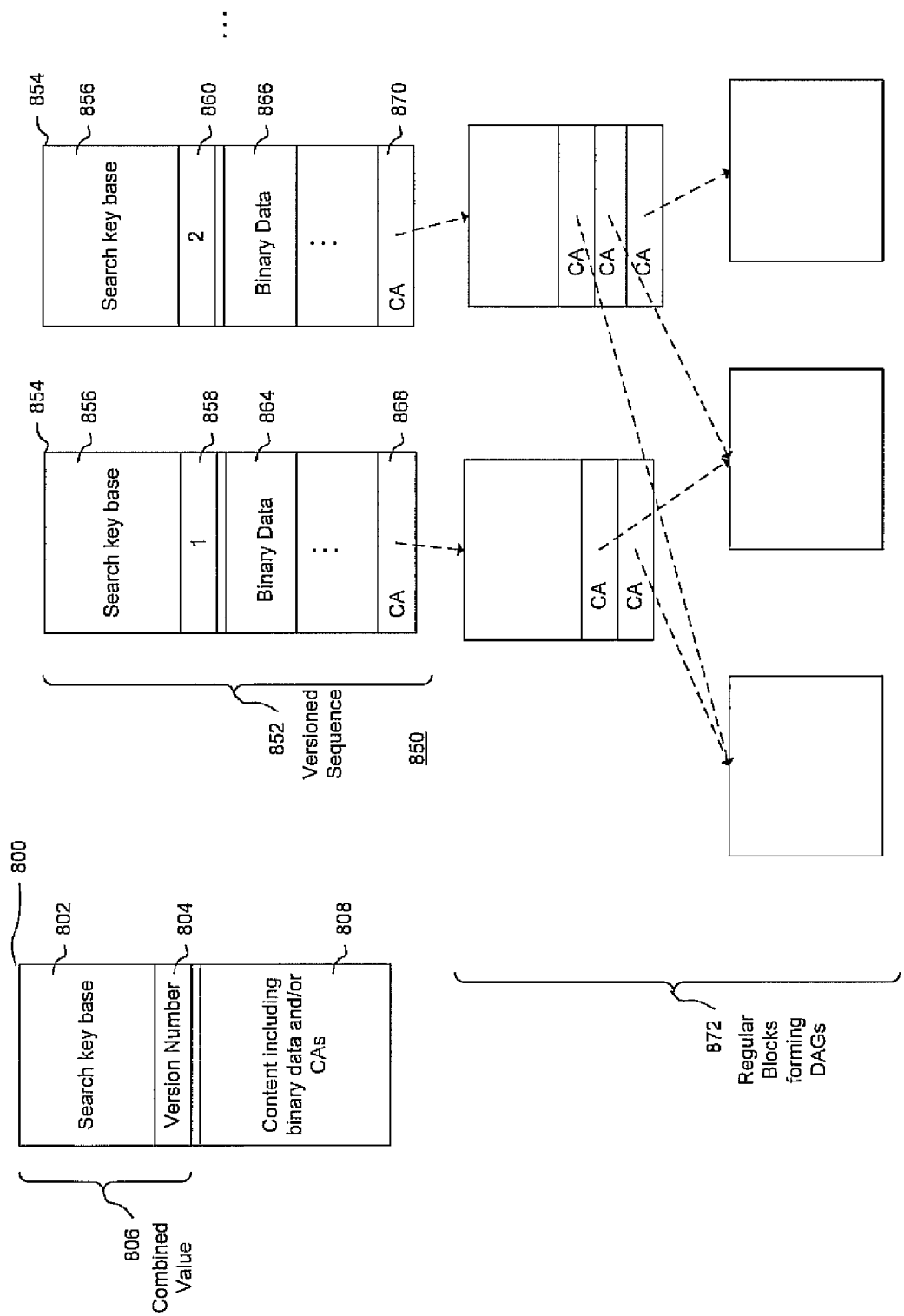

CONTENT ADDRESSABLE STORAGE SYSTEMS AND METHODS EMPLOYING SEARCHABLE BLOCKS

RELATED APPLICATION INFORMATION

This application claims priority to provisional application Ser. No. 61/095,994 filed on Sep. 11, 2008, incorporated herein by reference, and is related to non-provisional application Ser. No. 12/511,126, filed on Jul. 29, 2009, and now issued as U.S. Pat. No. 7,992,037, incorporated herein by reference.

BACKGROUND

1. Technical Field

The present invention generally relates to managing the storage of data on a storage medium, and more particularly, to managing the storage of data content using searchable data blocks on a secondary storage system.

2. Description of the Related Art

A common mechanism for storing information is a Content Addressable Storage (CAS) system, which bases an address for a block of data on its content rather than a pre-determined storage location. Typically, CAS systems are employed for fast storage and retrieval of relatively fixed content in secondary or "permanent" storage. Content Addressable Storage (CAS) systems provide access to data stored through the use of content addresses. A content address (CA) is generally formed by combining several pieces of information, at least one of which depends on the content of the object stored. In general, at least a part of a content address is derived from applying a strong hash function, such as SHA-1, on the contents of an associated data block of an object.

In contrast to conventional storage systems, a storage system based on content addresses is immutable in the sense that once a data block is written, it cannot be changed, as changing the data content of a block will also change its address. This not only gives users some guarantee that the data retrieved is exactly the same as the data stored, but it also permits the system to avoid storing duplicated blocks. For example, if the user performs multiple write operations for the same data, the system will store only one copy of the data and return the same content address for each of the write operations. This is possible because the address of a block of data is determined by the system. It should be noted, however, that although CAS systems are described herein as being immutable, "immutable" should not be construed to mean that data blocks cannot be deleted. Rather, an "immutable" system should be construed to mean that the system prevents data content from being referenceable with a content address already used for different data content.

Unfortunately, when employing a CAS system, a user must store the CA after writing an object in order to retain the capability of retrieving or reading the object at a later time. For example, because the CA cannot be derived without having the original content due to the use of the hash function, there is no way for a user to retrieve a block without storing the content address. In addition, even with advanced systems, such as EMC's C-clip, in which CAs are embedded in stored objects to permit for the creation of directed acyclic graphs (DAGs), the root of the DAG is a CA that includes address bits which are not derivable without the content. Upon writing an object, the C-clip's content address is returned to the application which must store it in a different location.

Thus, current storage systems employing CAS are not self-contained, as they need separate storage that retains the CAs of root blocks and, in many systems, other blocks as well.

SUMMARY

Accordingly, to improve storage efficiency, there is a need for a CAS system that does not require the use of separate storage space to retain addresses of data blocks. In accordance with various exemplary implementations of the present invention, use of "searchable blocks," as discussed herein below, obviates any need to maintain a separate storage for addresses of data block roots. For example, searchable blocks implemented as retention roots may be stored and referenced in accordance with a user-defined search key that need not be based on a hash of a block's content and that is simple for a user to recall. In addition, as discussed herein below, the remainder of the DAGs may be content addressed to permit seamless operation of all other features of a CAS system.

One exemplary embodiment of the present invention includes a content addressable data structure system stored on a storage medium, the system including a set of immutable regular blocks, wherein each regular block is referenceable with a content address derived by the system from data content of the respective regular block; and a set of immutable searchable blocks, wherein each searchable block is referenceable with a user-defined search key for the respective searchable block and wherein each searchable block is a root of a directed acyclic graph (DAG) including at least a subset of said regular blocks as DAG nodes.

Another exemplary embodiment of the present invention includes a method for managing data on a content-addressable storage system including a storage medium, the method including the steps of receiving a write request to write an immutable searchable block, the write request including a user-defined search key and data content; deriving an internal retention key based on the user-defined search key; and storing on the storage medium the immutable searchable block such that the searchable block roots a directed acyclic graph (DAG) of immutable regular blocks, wherein said searchable block includes said data content and is locatable with said internal retention key and each address of said regular blocks is a content address derived from content of a respective regular block An alternative exemplary embodiment of the present invention includes a method for deleting data on a content-addressable storage system including a storage medium, the method including the steps of providing a set of immutable data blocks comprising directed acyclic graphs (DAGs) of regular blocks rooted by searchable blocks stored on the storage medium, wherein each searchable block is locatable with a user-defined search key for the respective searchable block and wherein each regular block is locatable with a content address that is derived from content of the respective regular block; receiving a request to mark for deletion data content organized in one of said DAGs, wherein the request includes a first search key that is one of said user-defined search keys; deriving an internal deletion key based on said first search key; writing a deletion root block with the internal deletion key on said storage medium; and deleting from said storage medium the deletion root block and the searchable block that is locatable with said first search key.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 is a set of block diagrams illustrating representations of a searchable block and a versioned sequence of searchable blocks in accordance with exemplary embodiments of the present invention.

DETAILED DESCRIPTION OF PREFERRED EMBODIMENTS

Figure 1:
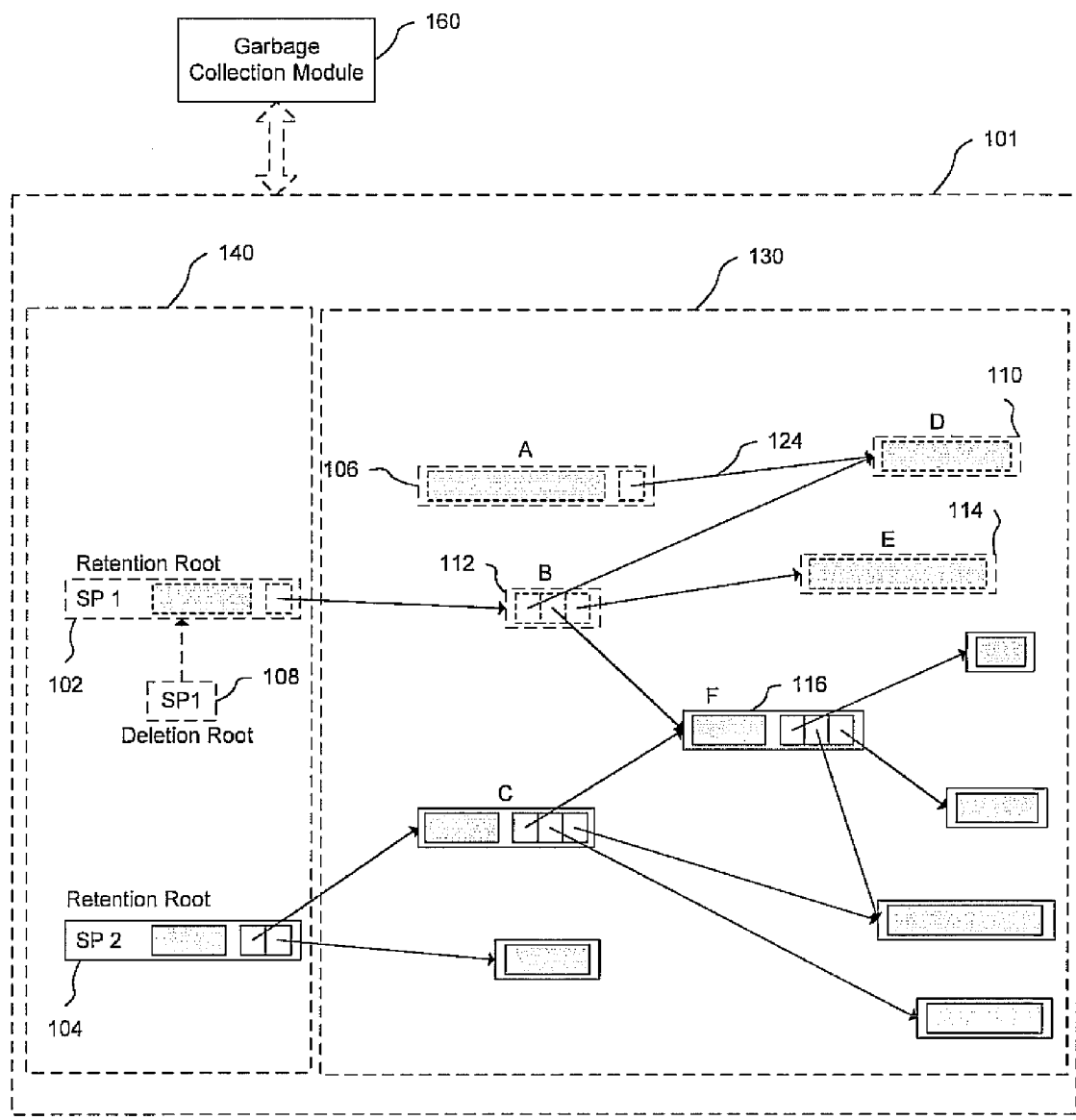
FIG. 1 is a block diagram illustrating a content addressable data structure system in accordance with one exemplary embodiment of the present invention.

To avoid maintaining a separate storage for content addresses of data blocks, storage systems in accordance with exemplary implementations of the present invention may provide a mechanism for storing at least two types of blocks: regular blocks and "searchable blocks."

In accordance with exemplary embodiments of the present invention, a regular block is written in a manner similar to that of other CAS systems in that the caller supplies as arguments the object to be stored, possibly including a description of where the object has embedded content addresses (CA) to other blocks. In addition, a value comprising a CA based on its content is returned to the user upon completion of the write:

CA<-- write_regular_block (data, list_of_embedded_CAs)

According to one exemplary implementation of the present invention, to implement a regular block, the block content (including any embedded CAs) may be hashed to derive a hash value. For example, referring now in detail to the figures in which like numerals represent the same or similar elements and initially to FIG. 7, a representation of an exemplary regular block 700 is illustrated. Data content of a regular block may include zero or more bytes of binary data (e.g., 'user-data') and/or may include exposed content addresses acting as DAG pointers. In the particular example provided in FIG. 7, the regular block 700 includes both non-CA binary data 702 and a list of content addresses 704. The content of the block 706, which includes both non-CA binary data 702 and the set of content addresses 704, is stored by the system and is the information on which a hash function may be applied to obtain a hash value for the block.

At least a portion of the hash value may be used, in accordance with, for example, a distributed hash table (DHT), to route the block to a storage node responsible for storing the block. The system may store the pair <hash value, block> locally and may return a CA that includes the portion of the hash value in addition to some other optional fields that may facilitate expedient retrieval of the block at a later time.

In order to retrieve data in a regular block, the CA is provided:

(data, list_of_embedded_CAs)<-- read_regular_block (CA)

For example, a read may use the portion of the hash value mentioned above to route to the node storing the pair <hash value, block> and may optionally use any other fields to speed up the local search for the pair on the node.

Any subsequent block write that duplicates a block written previously may be routed to the same node that stores the previously written block. The local node may implement a mechanism through which it recognizes that a block with the same hash value is already stored. This may be implemented, for example, by employing a local hash table. Thus, the (original) block can be retrieved without making use of the other fields.

In a sense, the block store resembles a (large) dictionary with the CAs acting as keys of the dictionary and the data plus the list of embedded CAs acting as the values of the dictionary. This can be implemented as a DHT. The primary feature of a regular block is that its key or content address is internally derived from the contents of the block.

As discussed herein below, storage of the CA for retrieval of roots of a DAG is avoided by employing searchable blocks. A searchable block is written differently from regular blocks. For searchable blocks, the system may internally derive a value that is similarly processed as a CA but is not a CA; the value is referred to herein as an "internal key." Thus, in contrast to write operations of regular blocks, according to exemplary embodiments of the present invention, write operations of searchable blocks may obtain a hash value by hashing a user-defined search key as opposed to hashing the block of content. Internally, the system may use the same routing mechanism used for regular blocks. Further, there is no need to generate a CA for it, because the pair may be retrieved without making use of other fields, as in the case of a duplicated write.

Thus, according to exemplary embodiments of the present invention, in addition to providing the data and/or a list of embedded CAs, the caller may also supply a unique user-defined "search key" for a searchable block:

write_searchable_block( data, list_of_embedded_CAs, search_key) /* No CA returned on completion*/

Here, the search_key is of client's choosing, and it need not be obtained by applying a hash function to the content being written. The search key of a block acts as an address for that block but is not a content address. Whereas users of a traditional CAS system cannot force the system to return a given, predetermined content address for a newly written block such that the block is retrievable by that content address, users of the present system may choose the search key when writing a searchable block. The search key may be any key of her choosing, which allows user-access to stored data without having to refer to a content address.

Figure 7:
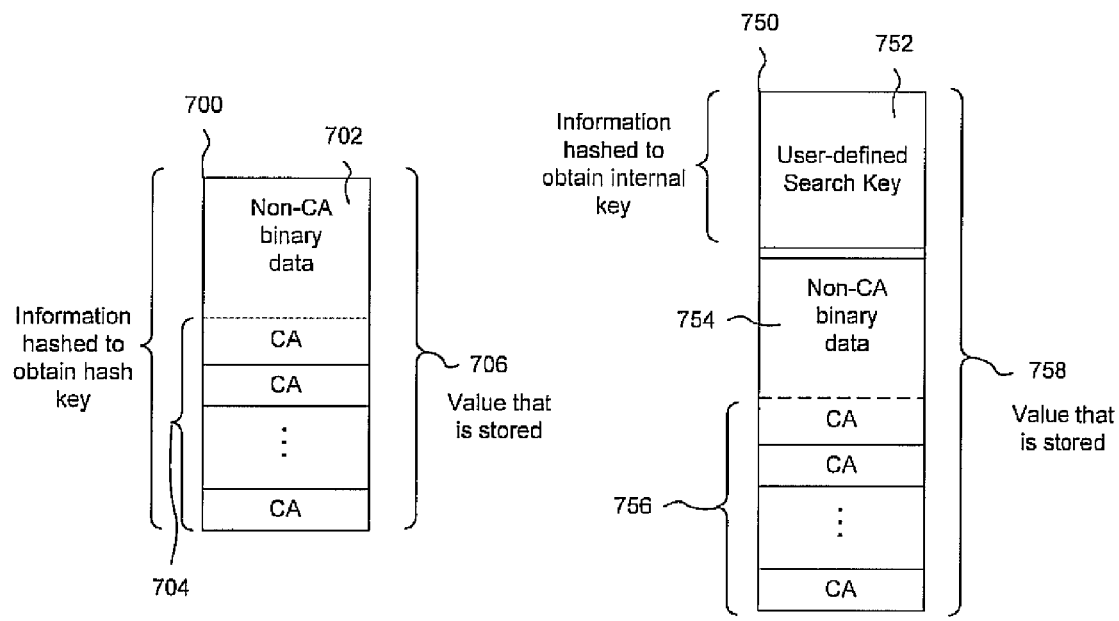
FIG. 7 is a set of block diagrams illustrating representations of a regular block and a searchable block in accordance with exemplary embodiments of the present invention.

With reference to FIG. 7, a representation of a searchable block 750 in accordance with one exemplary embodiment of the present invention is illustrated. As shown in FIG. 7, searchable block 750 may include a user-defined search key 752. Further, the data content of searchable block 750 may also include zero or more bytes of non-binary data 754 and/or a listing of CAs 756 acting as pointers to other blocks. Here, the internal key for the searchable block may be obtained by hashing the user-defined search key 752, rather than the entire block content. The value that is stored 758 may be comprised of the user-defined search key 752 and the data content in the block, which, as stated above, may include at least one of: zero or more bytes of non-CA binary data 754 or a listing of CAs 756 acting as pointers.

If storage blocks are arranged in a directed acyclic graph (DAG) configuration, the searchable blocks may be implemented as "retention roots" in that they may be used to store the root of a DAG of regular blocks. In order to retrieve the data, the client may supply the search_key as opposed to a CA:

```
(data, list_of_embedded_CAs) <-- read_searchable_block(
    search_key)
```

It should be noted that the storage system may be configured to reject a write if a block with a different content is already written with the same search_key. The storage system may reject the write to avoid the ambiguity that would arise during a read attempt for that search key. Thus, it is the responsibility of the client to choose a key that is likely to be unique.

For example, any information that is simple for the client to associate with the DAG that is probabilistically unlikely to cause a write request to be rejected because of collisions can be combined into a search key. It should be noted that for non-adversarial clients who are sharing the block store, it is fairly easy to avoid their sequence collision simply by making the client name part of the search key. With regard to adversarial clients, at least a portion of information that would be probabilistically difficult for an attacker to decipher, such as a private cryptographic key of a client, may be included in the search key. For example, for a file system using the present storage system as a backend secondary storage system, three such portions of information may include: (i) a name of the application, (e.g. "filesystem") using the backend storage to avoid collision with other, non-filesystem, users of the backend storage system, (ii) the filesystem name to avoid collision between the sequences of search keys of two different file systems, and (iii) a positive sequence number starting at 1 to act as a counter, as discussed more fully below.

To this point, the block storage has been described as a union of two separate storage pools comprised of a pool storing regular blocks that can be addressed through content addresses generated by the block store based on a block's content and a pool that stores blocks which can be located with search_keys that are generated by the client. However, two separate storage pools need not be maintained, as the code used to implement the regular blocks may be re-used to implement the searchable blocks. For example, the search keys for searchable blocks may be subjected to a hash function in the same way in which content addresses are obtained from regular blocks. Thus, a pseudo-content address may be created from a search key and stored in a distributed hash table (DHT) for subsequent lookup. This pseudo-content address may correspond to the "internal key" noted above. Accordingly, when a user wishes to read a block and provides a search key, the search key may be converted to an internal key used to lookup the block in a DHT.

As a result, internally, a searchable block can be handled in the same way as a regular block, except that its pseudo-CA is derived from the search key, instead of from the data and list of embedded CAs. As such, the searchable blocks and regular blocks may be included in the same storage pool, but differing in how their key is derived. As noted above, because the user-defined search key itself may be used to retrieve a searchable block, the pseudo-CA need not be supplied by a client for retrieval of the block. For this and other reasons, the pseudo-CA is not returned to the client at the completion of a write, which is different from the regular block case, in which the CA is returned.

A high-level algorithm for writing a searchable block in accordance with an exemplary embodiment of the present invention is illustrated below in Table 1. As shown in the algorithm, operations already available internally in a CAS storage system, such insertion and lookup of entries in a DHT, may be employed to implement searchable blocks:

TABLE 1

```
search_write( search_key, data)
    hashkey = hash_function( search_key)
    block = lookup( hashkey)
    if block is NOT found
        dht.insert( hashkey, (search_key, data))
    else // some block already exists for this hashkey
        if block is identical to search_key + data
            return success
        else
            return failure.
```

Table 2, illustrated below, provides a high-level algorithm for reading a searchable block in accordance with an exemplary embodiment of the present invention.

TABLE 2

```
search( search_key):
    hashkey = hash_function( search_key)
    return dht.lookup( hashkey)
```

Referring now to FIG. 1, a data storage system 100 employing searchable blocks in accordance with one exemplary implementation of the present invention is illustrated. It should be understood that embodiments described herein may be entirely hardware or including both hardware and software elements. In a preferred embodiment, the present invention is implemented in software and hardware, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores the program for use by or in connection with the instruction execution system, apparatus, or device.

The medium can be magnetic, optical, electronic, electromagnetic, infrared, or a semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Moreover, in exemplary embodiments of the present invention, the searchable blocks and regular blocks may be stored on a storage medium comprising one or more storage devices, including a network of storage devices. In addition, the methods disclosed herein may be implemented using a processor and memory configured to execute program instructions encoded in hardware and/or software.

Returning to FIG. 1, a programming model 101 for the system 100 may be based on an abstraction of a sea of variable-sized, content-addressed, highly-resilient blocks stored on a storage medium. System 100 may include a set of immutable regular blocks 130, wherein each regular block in the set is referenceable with a content address that is derived by the system from data content of the respective data block, for example, as discussed above. As noted above, a regular block address may be derived, for example, from a SHA-1 hash of its content. In addition, other information that can be used to locate a block in the system more efficiently than using only the internal hash key may be employed in the content address. The content address may be shorter or longer than the hash key.

Furthermore, system 100 may also include a set of immutable searchable blocks 140, each of which may be referenceable with a user-defined search key for the respective searchable block, as discussed above. For example, an internal key may be derived from the user-defined search key and used to locate a block. It should be understood that "derived" as employed herein may include, for example, obtaining an internal key by applying a hash function, as noted above, or by simply using the object from which the internal key is "derived." For example, an internal key may be derived from a user-defined search key in that the internal key is the search key. However, other means of derivation may be employed. Moreover, it should be noted that internal keys, for example, pseudo-content addresses discussed above, may be derived from a search key by applying, on the user-defined search key, the same hash function used to derive content addresses from regular blocks. In addition, the sets of searchable blocks 140 and regular blocks 130 may be stored in a DHT, which may map content addresses and internal keys to corresponding regular blocks 130 and searchable blocks 140, respectively. Thus, each searchable block is locatable with a corresponding, derived internal key.

Any block may include at least one of: zero or more bytes of binary data and/or a list of pointers 124, pointing to already written blocks to define DAGs of blocks. As noted above, the pointers may be implemented as content addresses. Here, as illustrated in FIG. 1, each searchable block 102, 104 may be a root of a DAG including at least a subset of regular blocks 130. Thus, the "internal keys" for retention roots implemented as searchable blocks may be equivalently referred to as "internal retention keys." In storage systems that provide deduplication features, blocks may be variable-sized to permit for an improved duplicate elimination ratio. As discussed more fully below, pointers 124 may be exposed to facilitate data deletion implemented as a variation of garbage collection with a garbage collection module 160.

As illustrated in FIG. 1, blocks may form a directed acyclic graph (DAG). If deduplication services are provided by the storage system, these DAGs may overlap at deduplicated blocks. Additionally, no cycle is possible in these structures, as long as the hash function used to derive block addresses is cryptographically secure. It should be understood that a "DAG," as referred to herein, may include a "tree," which is a special case of a DAG.

As noted above, a source vertex in the DAG may be a block of a special type termed a searchable retention root. However, it should be understood that exemplary embodiments of the present invention may have DAG roots that are not searchable blocks. Besides regular data and an array of addresses, a retention root may be configured as a searchable block with a user-defined search key employed to locate the block, as discussed above. Such a key may be arbitrary data. As noted above, a user may retrieve a searchable block by providing its search key instead of a system-generated cryptic block content address. Moreover, as discussed more fully below, multiple snapshots of the same file system may have roots organized as a versioned sequence of searchable retention roots locatable with a search key base, for example, derived from the file system name, and a counter incremented with each snapshot. Although searchable blocks can be retrieved by specifying an arbitrary search key, they do not have content addresses, as regular blocks have, so they are not pointed to in the system; as such, they do not create cycles in block structures.

With reference again to FIG. 1, the set of blocks 101 includes three source vertices 102, 104, and 106, two of which, 102 and 104, are retention roots implemented as searchable blocks. The other source vertex 106 is a regular block A, which indicates that this part of the DAG is still under construction.

Operations on the DAG structured data may include writing and reading regular blocks, writing searchable retention roots with a user-defined search key, searching for a retention root based on its search key and marking a retention root to be deleted by writing an associated deletion root 108 using the user-defined key, as discussed more fully below As mentioned above, searchable retention roots may be organized in a versioned sequence of retention roots. For example, a storage system may store a filesystem in a DAG, with the filesystem's superblock being the root of the DAG. Periodically, a new version of the filesystem may be updated and stored, which gives rise to a new DAG structure representing the new filesystem and a new superblock that is the new DAG's root. If the application is interested in writing many roots corresponding to different versions of a DAG, it is convenient for the system to: (i) write a new version of the root, and (ii) read the latest version written:

```
version_number <--WRITE_NEW_VERSION( search_key_base,
    data_with_embedded_CAs_exposed);
data_with_embedded_CAs_exposed <-- READ_LAST_VERSION(
    search_key_base)
```

Because the version numbers of the different file systems increase with time (along one dimension), the system may internally combine an integral version number with a user-defined search key value, referred to here as a "search key base" with respect to versioned sequences, to generate or derive the internal key. As understood by those of ordinary skill in the art, in view of the present disclosure, it is simple to generalize this to multiple dimensions, if necessary. Further, as noted above, a user-defined search key or search key base can be any sequence of bytes. This flexibility allows the implementation of versioned sequences of searchable blocks that can be identified by remembering only one search key base for the entire versioned sequence.

With reference to FIG. 8 with continuing reference to FIG. 1 and 7, representations of a searchable block 800 and a versioned sequence of searchable blocks 850 are illustrated. As noted above, to account for the possibility of different filesystem versions, the system may implement a process for generating internal retention keys for an entire sequence of new or updated DAGs by adding a sequence number to the search key. For example, as shown in FIG. 8, a searchable block 800 may include a combined value 806 including a search key base 802 appended with a version number 804. The combined value 806 may be used by the system to derive an internal retention key in the same way in which the system derived the internal key from the user-defined search key 752 of searchable block 750, discussed above. In addition, the internal key derived from the combined value 806 may be employed in the same manner discussed above. For example, the internal key may be used as an entry to a DHT mapping the internal key to the searchable block. The remainder of the searchable block 800 may comprise content 808 including at least one of: zero or more bytes of binary data or content addresses acting as pointers to other blocks. Accordingly, retention roots implemented as searchable blocks with version numbers may be referenceable or locatable with the user-defined search key in a manner similar to that described above.

It should be understood that all the fields may be consistent within the combined value 806 across all filesystem versions with the exception of the version number. For example, as illustrated in FIG. 8, each searchable block in the versioned sequence 852 may include the same user-defined search key 856 appended with different version numbers. For example, block 854 may include version number 1 (858), block 862 may include version number 2 (860), etc. Further, the searchable blocks may be implemented as retention roots including user-data 864, 866 and/or content addresses 868, 870 pointing to sets of regular blocks 872 forming DAGs.

It should also be understood that from the point of view of the user, the system with versioned sequences may retrieve searchable blocks in a manner similar to block retrieval discussed above. For example, a user or client may supply the user-defined search key and the system may automatically return the latest version of the corresponding searchable block to the user. Alternatively or additionally, the user may supply the user-defined search key and a version number to retrieve any version of the searchable block stored by the system. In turn, the system may return the corresponding version of the respective searchable block:

---
data_with_embedded_CAs_exposed <-- read_version(
    search_key_base, version_number)
---

In this way, the user may supply the same user-defined search key to retrieve any searchable block in the versioned sequence.

Because it may be simpler for a client to recall only a search key base (e.g., all fields of the search key except the version number) as opposed to the search key base and the latest version number, the system may employ a scheme to determine the most recent version number when reading an object.

For example, given that the version number starts at 1 in an exemplary implementation, an expanding search through the sequence may be performed until the correct search key with the most recent version number is determined. Thus, the system may find the last version written in a sequence with search_key base by simply iterating over all the blocks whose combined values 806 are derived by appending "1", "2", etc., until the read/search fails to find a block. If the failure first occurs for version N+1, then the block with version N was the last block successfully stored. This is helpful both for the READ_LAST_VERSION function noted above, as the system should find out the last version, and for the WRITE_NEW_VERSION function discussed above, as the system should write the block with the lowest version that is not yet used for a write. Of course, in certain exemplary implementations, the last version number may be cached and updated in memory so that the search may be performed only at startup.

While the expanding search process described above is performed by searching sequentially through all the version numbers, the same mechanism may be used to implement optimized search variations that reduce the number of blocks read prior to determining the correct version number. For example, the above-described expandable search scheme traverses O(n), order N, searchable blocks to find the block most recently written. The scheme may be optimized by employing O(log(n)) and using an expanding search, followed by a binary search. The expanding search may retrieve blocks $2^0$, $2^1$, $2^2$, etc. until the first read fails, for example at $2^p$, wherein $2^{p-1}$ was successful. Thus, the last version N is such that $2^{p-1} \leq N < 2^p$. Here, the expanding search used p~log (N) steps.

After the range $2^{p-1} \leq N < 2^p$ has been determined, the system may perform a binary search in the interval $\lfloor 2^{p-1}, 2^p)$ to find N. The binary search will take logarithm of interval length, which is also less than p, resulting in an overall logarithmic cost to the search. For example, to find the latest version 44, the system may read blocks in accordance with the approximate sequence provided in Table 3.

TABLE 3

1 -> success
2 -> success
4 -> success
8 -> success
16 -> success
32 -> success
64 -> fail
// end of expanding search
// start of binary search in interval [32, 64)
48 -> fail (48 is midpoint between 32 and 64)
40 -> success (40 is midpoint between 32 and 48)
44 -> success
46 -> fail
45 -> fail END In the example provided in Table 3, version number 44 was successful, version number 45 failed. Thus, version number 44 corresponds to the most recently written block in the versioned sequence.

Note that the expanding search schemes discussed above are operable on contiguously stored sequences. If gaps of unknown lengths were to exist in the versions numbers used, due, for example to deletion of certain versions of searchable blocks in a versioned sequence, then other search schemes may be employed to accommodate the automatic retrieval of the latest version of a searchable block in a versioned sequence.

Other services besides writing and reading of data using the data organization structures described above may include data deletion. In accordance with one exemplary implementation of the present invention, a single block should not be deleted immediately upon receiving a deletion request, as such a block may be referenced by other blocks. Because permitting users to delete individual blocks might give rise to dangling pointers due to de-duplication, it is preferable to perform deletion of blocks using a garbage collection operation. Among different types of garbage collection schemes, a modified reference counting operation offers an advantage in that it performs work proportional to the number of blocks written in between two collection cycles.

Referring again to FIG. 1, in a storage system employing a DAG data organization structure, an application program interface (API) may mark which parts of a DAG(s) should be deleted. To mark a retention root for deletion (i.e., not alive), the system may write a type of searchable block termed a searchable deletion root 108 or, equivalently, a deletion root block 108, with an internal key derived from a search key that is identical to the user-defined search key of the corresponding retention root. Here, the internal key may be termed an internal deletion key. The internal deletion key may be derived by hashing the corresponding user-defined search key and may be inserted in a DHT. In FIG. 1, for example, a deletion root 108 is associated with the retention root SP1 102. The garbage collection module 160 may mark for deletion all blocks not reachable from the alive retention roots. For example in FIG. 1, blocks 112, 110 and 114 will be marked for deletion as a result of retention root 102 being marked for deletion. It should be noted that block 106 is also marked for deletion, as it does not have a retention root pointing to it. In contrast, block 116 will be retained, as it is reachable from the retention root SP2 104. Retention root 104 is "alive" because it does not have a matching deletion root.

it should be noted that it is permissible to permit a user to delete roots, as deletion of roots does not create dangling pointers. As noted above, searchable blocks do not have content addresses. Normally, keeping reference counts involves modifying counters. However, modifying counters is not possible in an immutable storage system.

Figure 9:
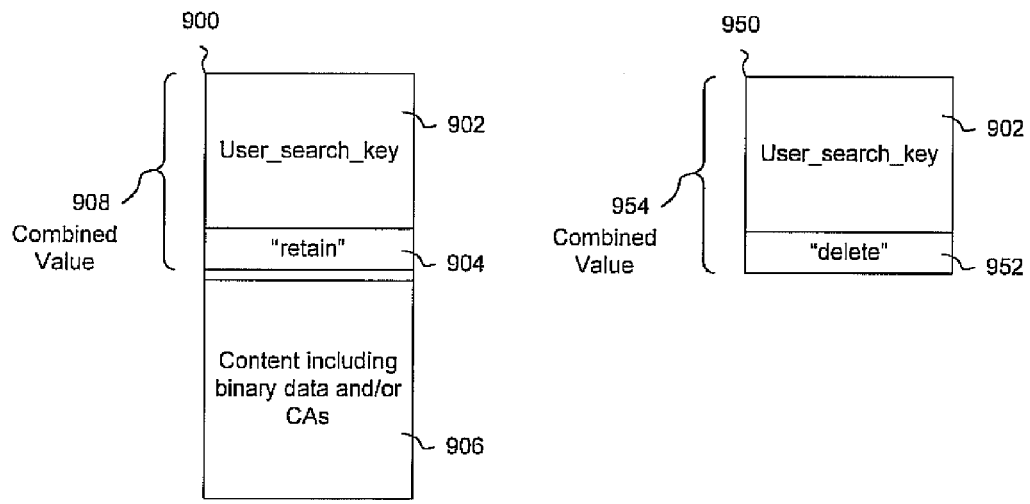
FIG. 9 is a set of block diagrams illustrating representations of a searchable retention root block and a deletion root block in accordance with exemplary embodiments of the present invention.

To illustrate one exemplary implementation of deletion roots in accordance with an exemplary embodiment of the present invention that addresses this problem, reference is now made to FIG. 9, illustrating representations of a searchable retention root block 900 and a deletion root block 950. It should be understood that both retention roots and deletion roots are searchable blocks. Here, the system may implement retention roots and deletion roots using RETAIN and DELETE functions, respectfully, as illustrated in Table 4, below.

TABLE 4

```
RETAIN( search_key, data_with_embedded_CAs_exposed)
{
  write_searchable( search_key + "retain",
  data_with_embedded_CAs_exposed)
}
DELETE( search_key)
{
  write_searchable( search_key + "delete")
}
```

Thus, to implement the RETAIN function, the user supplies the user-defined search key 902, any corresponding data content 906, such as zero or more binary bytes of data and/or any exposed CAs acting as pointers. Similarly, to implement the DELETE function, the user supplies the user-defined search key. As shown in the code in Table 4, the association can be realized by deriving the internal retention key and the internal deletion key for the retention root block and the deletion root block, respectfully, from the user-defined key.

For example, as illustrated in FIG. 9, the system may write the retention root 900 by appending "retain" 904 to the user-defined search key 902. The system may derive the internal retention key from the combined value 908, which includes both the user-defined search key 902 and the "retain" label 904. For example, the internal retention key may be derived by applying a hash function, as discussed above, and may be used in a DHT for writing, retrieval and deletion purposes. Similarly, the system may write the deletion root 950 by appending "delete" 952 to the user-defined search key 902. The system may similarly derive the internal deletion key from the combined value 954, which includes both the user-defined search key 902 and the "delete" label 952. The internal deletion key may be included in the DHT, which may map the internal deletion key to the corresponding block 950. It should be noted that the "retain" and "delete" labels are arbitrary and any different labels may be used to permit the system to differentiate between retention and deletion roots.

Writing the deletion root 950 in accordance with FIG. 9B marks the retention block 900 for deletion. For example, when the garbage collection module 160 of FIG. 1 begins a garbage collection operation, if a deletion root is encountered, for example, by finding a corresponding internal deletion key in a DHT, module 160 may cause the retention root to be deleted and may cause the deletion of the deletion root itself, as it has served its purpose. In this way, for example, the deletion root may initiate the deletion of a corresponding searchable block. Writing the deletion root solves the problem of adjusting reference counters on an immutable storage system, as the writing has the same effect as adjusting a reference count on the retention root to indicate that it should be deleted.

It should be noted that to simplify the design of a storage system, a deletion operation may be split into two phases: a read-only phase, during which blocks are marked for deletion and users cannot write data; and a read-write phase, during which blocks marked for deletion are re-claimed and users can issue both reads and writes. Space reclamation may be performed in the background during regular read-write operation. Before entering a read-only phase, all blocks to be retained should be pointed to by alive retention roots. Having a read-only phase simplifies the deletion implementation, as it eliminates the influence of writes on the deletion-marking process.

In exemplary implementations, deletion may be implemented with a per-block reference counter configured to count the number of pointers in a data block that point to the block. Reference counters need not be updated immediately on write. This is an advantage in a immutable store. Instead, they may be updated subsequently in the read-only phase in which all pointers written since the previous read-only phase are processed so that counter update is incremental. For each pointer detected after a write, the reference counter of the block to which it points is incremented. After all pointers are detected and incrementation is completed, all blocks with reference counter equal to zero are marked for deletion. Moreover, reference counters of blocks pointed to by blocks already marked for deletion (including roots with associated deletion roots) may be decremented. Thereafter, any blocks with reference counters equal to zero due to a decrement may be marked for deletion and reference counters of blocks pointed to by blocks already marked for deletion may be decremented. The marking and decrementing process may be repeated until no additional blocks can be marked for deletion. At this point, the read-only phase may end and blocks marked for deletion can be removed in the background. Although garbage collection is exemplified in the above using reference counting, other garbage collection methods, such as "mark-and-sweep," can also be employed. Alternatively, the blocks to be retained, as opposed to the blocks to be deleted, may be marked in a garbage collection operation.

Figure 2:
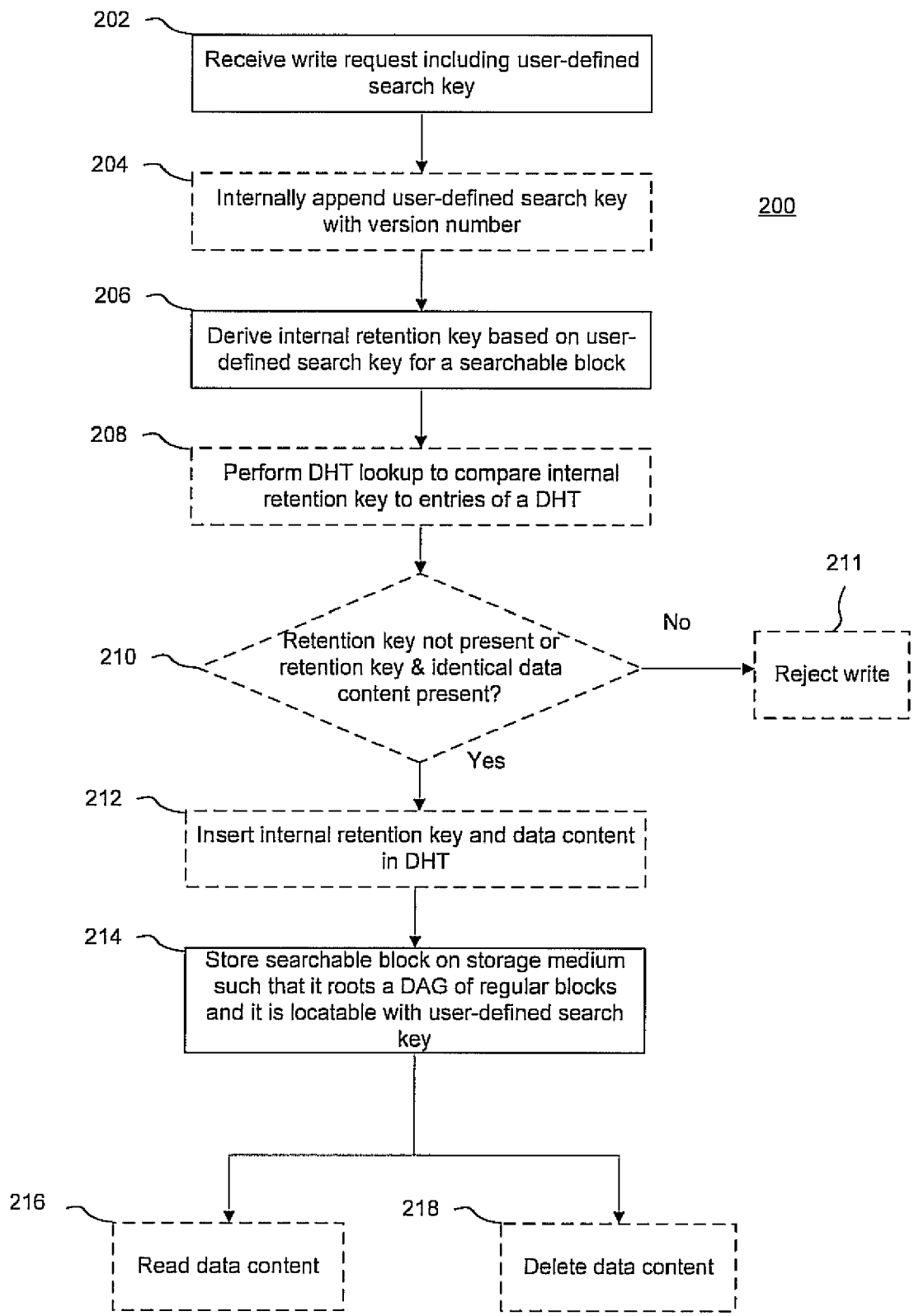
FIG. 2 is a block/flow diagram illustrating a method for managing data on a content-addressable storage system in accordance with one exemplary embodiment of the present invention.

Referring now to FIG. 2, a method 200 for managing data on a content-addressable storage system including a storage medium in accordance with one exemplary implementation of the present invention applying principles disclosed above is illustrated. Method 200 may begin at step 202 in which the storage system receives a request to write an immutable searchable block from a client. The request may include information as discussed above, such as a user-defined search key and the data content to be included in the searchable block. As noted above, the data content may include zero or more bytes of binary data and/or exposed content addresses acting as pointers.

Optionally, at step 204 the storage system may be configured to internally append the user-defined search key with a version number to identify the searchable block as a component of a versioned sequence of searchable blocks, as discussed above. It should be noted that the system may determine the correct version number to append to the search key by employing, for example, the expanding search process described above. For example, the system may choose the first failed version number immediately succeeding the latest correct version number. In the example provided in Table 3, the correct version number would correspond to "45."

At step 206, the storage system may be configured to derive an internal retention key based on the user-defined search key, as discussed above. For example, as discussed above, the storage system may apply a hash function, such as SHA-1, on the search key to generate the internal retention key. In addition, if optional step 204 is performed, the internal retention key may be based on both the user-defined search key and the version number, as discussed above.

Optionally, at step 208, the storage system may perform a DHT lookup to compare the internal retention key to entries of the DHT. Thereafter, the system may determine whether to service the write.

For example, the system may optionally perform step 210 to determine whether the internal retention key is present in the DHT. If the retention key is not present in the DHT, then the write may be serviced and the method may proceed to step 212 or step 214. If the internal retention key is an entry in the DHT and the data content in the request is not identical to the value mapped to the retention key entry in the DHT, then the write is rejected at step 211, as the user-defined search key (or the user-defined search key/version number combination if versioned sequences are employed) has already been used for different data content. As such, a message may be returned to the user indicating the conflict and prompting another selection of the user-defined search key (or user-defined search key/version number combination). If the retention key is an entry in the DHT and the data content in the request is identical to the value mapped to the retention key entry in the DHT, then the write may be serviced and the method may proceed to step 212 or step 214. Here, because the user has already stored the data content with the user-defined search key, there is no need to indicate that the write was rejected, as the content of the secondary storage system is consistent with the user's wishes. Alternatively, if the retention key is an entry in the DHT and the data content in the request is identical to the value mapped to the retention key entry in the DHT, then the write may be rejected in step 211 and a message may be returned to a user indicating that the data content has already been stored with the user-defined search key (or with the user-defined search key/version number combination).

Optionally, at step 212, the storage system may insert the searchable block and the internal retention key in the DHT. For example, if the internal retention key was derived by applying a hash function, then the internal key may be stored in the DHT. In this way, as stated above, the storage system may employ operations already exiting in a CAS system to implement searchable blocks.

At step 214, which may coincide with step 212, the storage system may store the immutable searchable block on a storage medium such that the searchable block roots a DAG of regular blocks. For example, the searchable block may correspond to one of the retention roots discussed above with regard to FIG. 1. Here, the searchable block includes the data content and is locatable with the internal retention key, as discussed above. In addition, the address of each regular block may be a content address derived from the content of a respective regular block.

It should be noted that the regular blocks may correspond to blocks stored by the user prior to storing the searchable block when constructing a DAG. Further, the content address of each regular block may be returned to the user after they are written. For example, the user may employ the content addresses as pointers during construction of the DAG. However, it should also be noted that in contrast to regular blocks, as stated above, an address of a searchable block need not be returned to a user. Additionally, if a hash function is applied to derive the internal search key in step 206, the hash function may be the same as that used to generate hash keys from which the content addresses of regular blocks are derived. Thus, the DHT mentioned above may map the internal retention key and the content addresses to the searchable block and the regular blocks, respectively.

Optionally, the storage system may use searchable blocks to perform other data services in addition to writing data content. For example, a read operation and delete operation for the data content may be performed at steps 216 and 218, respectively, using searchable blocks.

Figure 3:
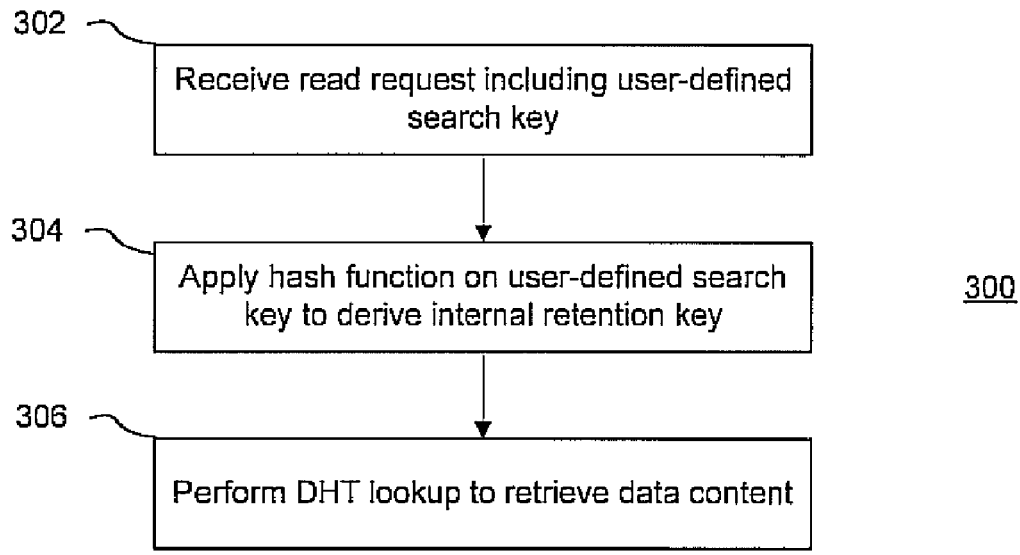
FIG. 3 is a block/flow diagram illustrating a method for reading data on a content-addressable storage system in accordance with one exemplary embodiment of the present invention.

With reference to FIG. 3, with continuing reference to FIG. 2, one exemplary method 300 for reading data content in accordance with an exemplary embodiment of the present invention, which may be performed at step 216, is illustrated. Method 300 may begin at step 302 in which the storage system may receive a request to read the data content. As discussed above, the read request may include the same user-defined search key employed to write the data content. Optionally, the read request may also include a version number for retrieving a version of the searchable block that is part of a versioned sequence, as discussed above.

At step 304, in response to receiving the request, the storage system may apply the hash function on the user-defined search key to derive and obtain the internal retention key.

At step 306, the system may perform a DHT lookup with the internal retention key to retrieve the data content from the searchable block and present the data content to a user.

Figure 4:
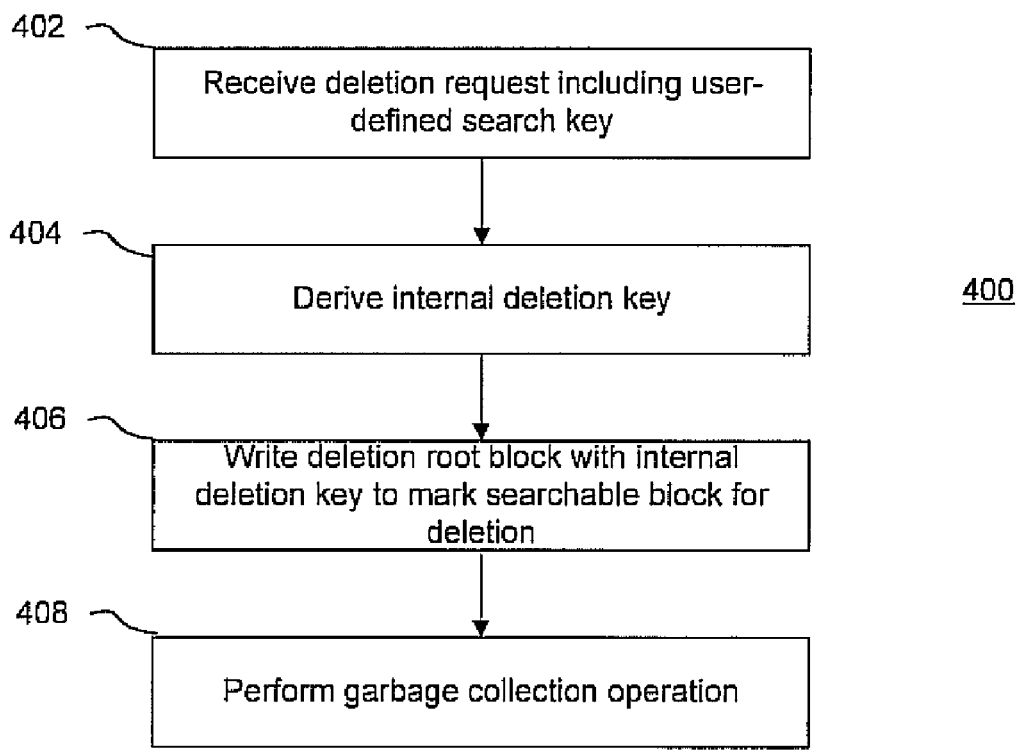
FIG. 4 is a block/flow diagram illustrating a method for deleting data on a content-addressable storage system in accordance with one exemplary embodiment of the present invention.

With reference now to FIG. 4 with continuing reference to FIGS. 1 and 2, an exemplary method 400 for deleting data content in accordance with an exemplary embodiment of the present invention using principles discussed above, which may be performed at step 218, is illustrated. Method 400 may begin at step 402 in which the storage system may receive a request from a user to delete the data content. As discussed above, the deletion request may include the user-defined search key employed to write the content.

At step 404, the storage system may derive an internal deletion key based on the user-defined search key. For example, the hash function may be applied to the user-defined search key to generate the internal deletion key, as discussed above. Furthermore, the internal deletion key may be derived also from a label, such as "delete," distinguishing a deletion root block from a corresponding retention root block.

At step 406, the storage system may be configured to write a deletion root block with the internal deletion key to mark the respective searchable retention root for deletion. For example, as discussed above with regard to FIG. 1, a deletion root 108 may be written to mark the searchable block 102 for deletion.

At step 408, the garbage collection module 160 may perform a garbage collection operation on blocks associated with the searchable block. For example, the garbage collection module 160 may be configured to delete the searchable retention root block, the deletion root block, and any unreachable regular blocks in the corresponding DAG.

Figure 5:
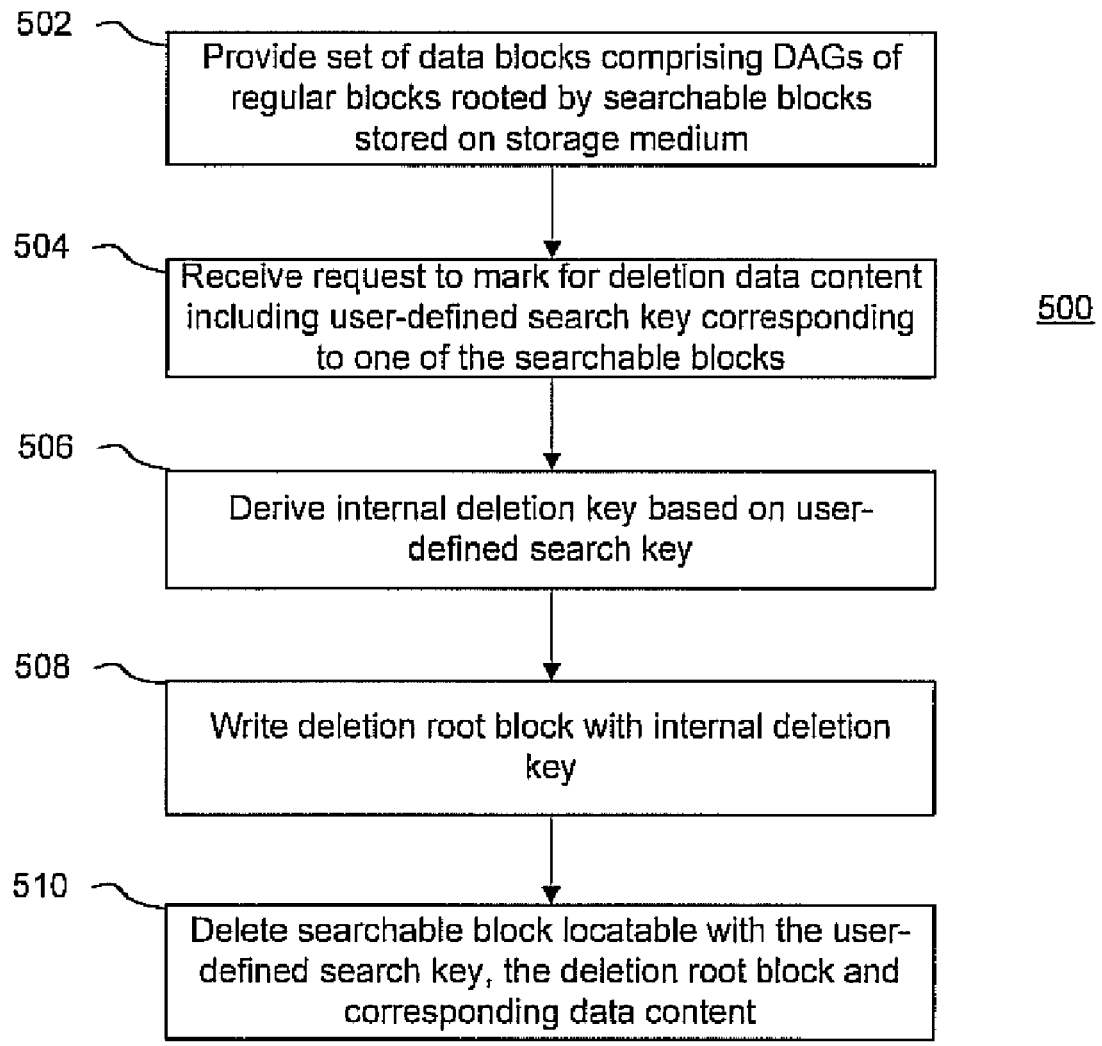
FIG. 5 is a block/flow diagram illustrating an alternative method for deleting data on a content-addressable storage system in accordance with one exemplary embodiment of the present invention.

Referring now to FIG. 5 with continuing reference to FIG. 1 and 9, a more specific method 500 for deleting data content in a content addressable storage system employing searchable blocks in accordance with one exemplary embodiment of the present invention is illustrated. Method 500 may begin at step 502 by providing a set of data blocks comprising DAGs of regular blocks rooted by searchable blocks stored on a storage medium. For example, the set of blocks may be organized as discussed above with respect to FIG. 1. For example, each searchable block may be locatable with an internal retention key derived from a different user-defined search key (or a different search key/version number combination). In addition, each regular block may be locatable with a content address that is derived from content of the respective regular block, as discussed above.

At step 504, the storage system may receive a request to mark for deletion data content organized in one of the DAGs. The deletion request may include a search key that is identical with the search key used to locate the searchable block that roots the DAG in which the data content is stored. Here, the search key provided in the deletion request may be referred to as a "first search key."

At step 506, the storage system may derive an internal deletion root key based on the first search key. For example, if the internal retention root was derived by applying a hash function to the first search key and "retain," the internal deletion root may be derived by applying the same hash function to the first search key and "delete."

At step 508, the storage system may write a deletion root block to the storage medium using the internal deletion key, for example, as described above with respect to FIGS. 1 and 9.

At step 510, the storage system may delete from the storage medium the deletion root block and the searchable block that is locatable with the first search key. For example, as discussed above, the garbage collection module 160 may use the deletion root block as an indication to delete the deletion root block, the corresponding searchable block, and any corresponding unreachable regular blocks in the DAG.

Figure 6:
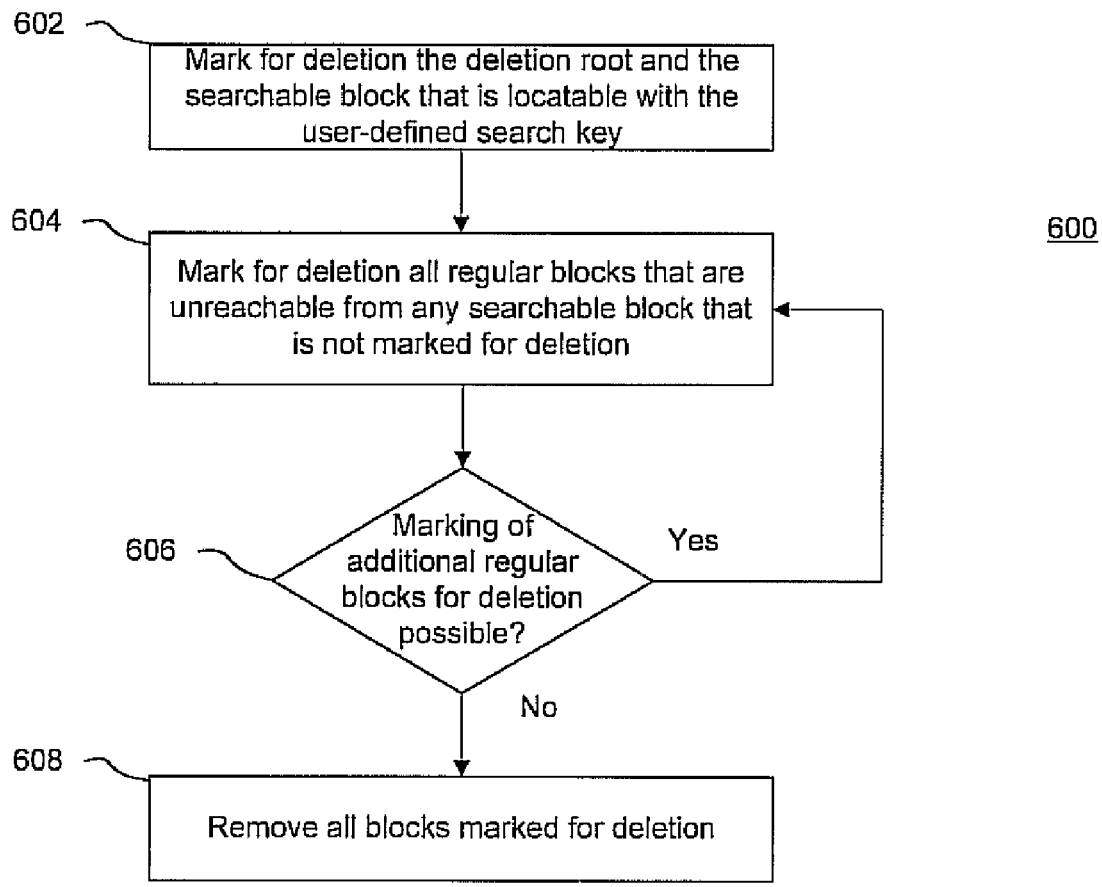
FIG. 6 is a block/flow diagram illustrating a method for implementing deletion of at least part of a DAG on a content-addressable storage system in accordance with one exemplary embodiment of the present invention.

It should be understood that there are various methods by which the deletion step 510 may be performed. Referring now to FIG. 6 with continuing reference to FIGS. 1 and 5, one method 600 for implementing the deletion of data content organized in a DAG in accordance with an exemplary embodiment of the present invention is illustrated. Method 600 may begin at step 602 in which the storage system may mark for deletion the deletion root and the searchable block that is locatable with the user-defined search key (first search key). For example, the garbage collection module 160 may mark the deletion root and the corresponding searchable retention root for deletion. It should be understood that in one exemplary embodiment of the present invention, the garbage collection operation may be initiated by the user. For example, after receiving an indication from the system that the deletion root was successfully written, the user may submit a request to initiate garbage collection on the associated DAG. Further, the garbage collection operation may apply on all DAGs having an associated deletion root, as discussed above.

At steps 604-606, the garbage collection module 160 may iteratively mark for deletion all regular blocks that are unreachable from any searchable block that is not marked for deletion. For example, the iteration deletion method discussed above may be implemented in which all blocks which have no pointers pointing to it may be marked for deletion. An "unreachable" regular block should be understood to mean that there is no path connecting any searchable block not marked for deletion to the regular block through DAG pointers or a chain of DAG pointers. For example, with reference to FIG. 1, block E 114 is unreachable from any searchable block not marked for deletion, such as searchable retention root 104. Similarly, block F 116 is reachable from block 104, which is a searchable block not marked for deletion.

At step 608, the garbage collection module 160 may be configured to remove all blocks marked for deletion. It should be understood however, that other garbage collection methods may be implemented by those of ordinary skill in the art in view of the teachings described herein. For example, systems and methods may be modified to mark blocks that are to be kept as opposed to marking blocks to be deleted. In this case, all unmarked blocks may be deleted or removed from the storage medium.

As discussed herein above, the use of searchable blocks advantageously permits a novel and efficient way of providing data services such as writing, reading and deleting data content. Furthermore, as discussed above, the use of searchable blocks avoids the need to store content addresses of retention roots. Moreover, even if the address of retention roots are stored, the use of searchable blocks permits the user to decide apriory the search prefix of retention roots and can store it independently of the workings of the storage system. For example, the user does not have to synchronize the search prefix with the system and need not wait for the system to return a content address.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A content addressable data structure system stored on a storage medium, the system comprising:
  a set of immutable regular blocks, wherein each regular block is referenceable with a content address derived by the system from data content of the respective regular block; and
  a set of immutable searchable blocks, wherein each searchable block is referenceable with a user-defined search key for the respective searchable block and wherein each searchable block is a root of a directed acyclic graph (DAG) including at least a subset of said regular blocks as DAG nodes, wherein each of said content addresses is derived by applying a hash function on data content of a respective regular block and wherein each of said searchable blocks are locatable with an internal retention key obtained by applying said hash function on a corresponding user-defined search key for a respective searchable block.

2. The system of claim 1, wherein each of said regular and searchable blocks includes at least one of: exposed content addresses acting as DAG pointers or bytes of binary data.

3. The system of claim 1, wherein said sets of regular blocks and searchable blocks are stored in a distributed hash table mapping said content addresses and said internal retention keys to corresponding regular blocks and searchable blocks, respectively.

4. The system of claim 1, wherein at least a subset of said searchable blocks compose a versioned sequence of searchable blocks and wherein each searchable block in said sequence is identified by a different version number and is retrievable with a corresponding user-defined search key.

5. The system of claim 1, further comprising:
at least one deletion root, wherein each deletion root is written with an internal deletion key derived from a user-defined search key of one of said searchable blocks and wherein each deletion root marks for deletion one of said searchable blocks.

6. The system of claim 5, wherein said set of regular blocks, said set of searchable blocks and said at least one deletion root are stored in a distributed hash table mapping said content addresses, said internal retention keys and said internal deletion keys to corresponding regular blocks, searchable blocks and deletion roots, respectively.

7. The system of claim 6, further comprising:
a garbage collection module configured to delete blocks that are unreachable from any searchable blocks that are not marked for deletion.

8. A method for managing data on a content-addressable storage system including a storage medium comprising:
receiving a write request to write an immutable searchable block, the write request including a user-defined search key and data content;
deriving an internal retention key based on the user-defined search key; and
storing on the storage medium the immutable searchable block such that the searchable block roots a directed acyclic graph (DAG) of immutable regular blocks, wherein said searchable block includes said data content and is locatable with said internal retention key and each address of said regular blocks is a content address derived from content of a respective regular block.

9. The method of claim 8, wherein the deriving further comprises applying a hash function on the user-defined search key to generate the internal retention key and wherein said content addresses are derived from hash keys generated by applying said hash function on content stored in each respective regular block.

10. The method of claim 9, further comprising:
inserting said searchable block and said internal retention key in a distributed hash table (DHT) such that the DHT maps said internal retention key and said content addresses to said searchable block and corresponding regular blocks, respectively.

11. The method of claim 10, further comprising:
performing a DHT lookup before said inserting to compare the internal retention key to entries of the DHT, wherein said inserting is performed if the DHT does not include said internal retention key or if the DHT includes said internal retention key and maps said internal retention key to a value that is identical to said data content.

12. The method of claim 11, further comprising:
receiving a read request to retrieve said data content, said read request including said user-defined search key;
applying the hash function on said user-defined search key to derive said internal retention key in response to receiving said read request; and
performing a DHT lookup with said internal retention key to retrieve said data content.

13. The method of claim 12, further comprising:
internally appending the user-defined search key with a version number to identify the searchable block as a component of a versioned sequence of searchable blocks, wherein said internal retention key is based on both said user-defined search key and said version number.

14. The method of claim 13, wherein said read request includes said version number for retrieving a version of said searchable block that is a part of said versioned sequence.

15. The method of claim 8 further comprising:
receiving a deletion request to delete said data content, the deletion request including said user-defined search key;
deriving an internal deletion key based on said search key; and
writing a deletion root block with said internal deletion key on the storage medium to mark said searchable block for deletion.

16. The method of claim 15, further comprising:
performing a garbage collection operation on regular blocks associated with said searchable block.

17. A method for deleting data on a content-addressable storage system including a storage medium comprising:
providing a set of immutable data blocks comprising directed acyclic graphs (DAGs) of regular blocks rooted by searchable blocks stored on the storage medium, wherein each searchable block is locatable with a user-defined search key for the respective searchable block and wherein each regular block is locatable with a content address that is derived from content of the respective regular block;
receiving a request to mark for deletion data content organized in one of said DAGs, wherein the request includes a first search key that is one of said user-defined search keys;
deriving an internal deletion key based on said first search key;
writing a deletion root block with the internal deletion key on said storage medium; and
deleting from said storage medium the deletion root block and the searchable block that is locatable with said first search key.

18. The method of claim 17 wherein the deleting further comprises:
marking for deletion said deletion root and the searchable block that is locatable with said first search key;
iteratively marking for deletion all regular blocks that are unreachable from any searchable block that is not marked for deletion; and
removing all blocks marked for deletion.

19. A content addressable data structure system stored on a storage medium, the system comprising:

a set of immutable regular blocks, wherein each regular block is referenceable with a content address derived by the system from data content of the respective regular block; and a set of immutable searchable blocks, wherein each searchable block is referenceable with a user-defined search key for the respective searchable block and wherein each searchable block is a root of a directed acyclic graph (DAG) including at least a subset of said regular blocks as DAG nodes, wherein at least a subset of said searchable blocks compose a versioned sequence of searchable blocks and wherein each searchable block in said sequence is identified by a different version number and is retrievable with a corresponding user-defined search key.

* * * * *